United States Patent
Antipa et al.

(10) Patent No.: US 12,340,262 B2
(45) Date of Patent: Jun. 24, 2025

(54) CRYPTOGRAPHIC AGILITY APPLICATION PROGRAM INTERFACE ENGINE

(71) Applicant: INFOSEC GLOBAL INC., Toronto (CA)

(72) Inventors: Adrian Antipa, Caledon East (CA); Vladimir Soukharev, Toronto (CA)

(73) Assignee: INFOSEC GLOBAL INC., Toronto (CA)

(*) Notice: Subject to any disclaimer, the term of this patent is extended or adjusted under 35 U.S.C. 154(b) by 190 days.

(21) Appl. No.: 17/807,929

(22) Filed: Jun. 21, 2022

(65) Prior Publication Data

US 2022/0413946 A1 Dec. 29, 2022

Related U.S. Application Data

(60) Provisional application No. 63/214,443, filed on Jun. 24, 2021.

(51) Int. Cl.
*G06F 9/54* (2006.01)
*G06F 9/445* (2018.01)
*H04L 9/32* (2006.01)

(52) U.S. Cl.
CPC .......... *G06F 9/541* (2013.01); *G06F 9/44521* (2013.01); *H04L 9/3247* (2013.01)

(58) Field of Classification Search
CPC ..... G06F 9/541; G06F 9/44521; H04L 9/3247
See application file for complete search history.

(56) References Cited

U.S. PATENT DOCUMENTS

| | | | | |
|---|---|---|---|---|
| 8,713,667 | B2* | 4/2014 | Kalibjian | G06F 21/602 726/14 |
| 2002/0108121 | A1* | 8/2002 | Alao | H04N 21/235 725/110 |
| 2002/0108122 | A1* | 8/2002 | Alao | H04L 65/613 348/E7.054 |
| 2017/0322836 | A1* | 11/2017 | Ionescu | G06F 9/54 |
| 2022/0182364 | A1* | 6/2022 | Benson | G06F 9/541 |

FOREIGN PATENT DOCUMENTS

WO WO-2012095515 A1 * 7/2012 ............. G06F 21/14

* cited by examiner

*Primary Examiner* — Azizul Choudhury
(74) *Attorney, Agent, or Firm* — Bhole IP Law; Marc Lampert

(57) ABSTRACT

There is provided a computer-implemented method for remote delegation of cryptographic processing from an application to other entities. The method including: structuring the cryptographic package with an application programming interface (API) as an engine of the cryptographic package and each provider including a dynamic-link library (dll) of an instance of the API; registering the API to a cryptographic library as a new crypto suite through the engine; implementing a control policy at a control entity to provide runtime input to the providers; receiving an API call from the application to implement a cryptographic action via the API, the API selecting the cryptographic scheme to implement the action.

9 Claims, 1 Drawing Sheet

CRYPTOGRAPHIC AGILITY APPLICATION PROGRAM INTERFACE ENGINE

TECHNICAL FIELD

The following relates to cryptographic protocols.

SUMMARY

What we claim is a method to delegate the dealing with cryptographic algorithms from an application to other entities/components. The entities are the provider and control policy. This allows for use of the application without need to rebuild it, with different cryptographic schemes. We call this feature agility. So, the role played by the application is played now by provider and policy, leaving the application oblivious to changes. The methodology via which the agility or any cryptographic provider is added is by taking an existing cryptographic library (in use or to be in use by that application) and replacing the API in that cryptographic library to a different one that can support cryptographic agility or any other use case. Thus, we are replacing API.

In an aspect, there is provided a computer-implemented method for remote delegation of cryptographic processing from an application to other entities, the method comprising: structuring the cryptographic package with an application programming interface (API) as an engine of the cryptographic package and each provider comprising a dynamic-link library (dll) of an instance of the API; registering the API to a cryptographic library as a new crypto suite through the engine; implementing a control policy at a control entity to provide runtime input to the providers; receiving an API call from the application to implement a cryptographic action via the API, the API selecting the cryptographic scheme to implement the action.

In a particular case of the method, structuring the cryptographic package comprises replacing the engine of an existing cryptographic library used by the application by a separate engine.

In another case of the method, each node in each provider comprises only one cryptographic algorithm.

In yet another case of the method, for each of the providers, each of the nodes and cryptographic algorithms have fixed generic names respectively assigned.

In yet another case of the method, a real name of each of the algorithms is in a description field associated with the respective node.

In yet another case of the method, the method further comprising generating a configuration file listing active cryptographic schemes at runtime, and wherein each provider determines if their respective cryptographic schemes are present in the configuration file prior to implementation by the application.

In yet another case of the method, the cryptographic action is signing a digital signature.

In yet another case of the method, the cryptographic action is authenticating a digital signature.

In yet another case of the method, the cryptographic library comprises OpenSSL.

In yet another case of the method, the cryptographic library comprises one of WolfSSL, BouncyCastle, and BoringSSL.

These and other aspects are contemplated and described herein. The foregoing summary sets out representative aspects to assist skilled readers in understanding the following detailed description.

DESCRIPTION OF THE DRAWINGS

An embodiment of the present invention will now be described by way of example only with reference to the accompanying drawings, in which:

FIG. 1 is a block diagram of an example embodiment.

DETAILED DESCRIPTION

Embodiments will now be described with reference to the figures. It will be appreciated that for simplicity and clarity of illustration, where considered appropriate, reference numerals may be repeated among the FIGURES to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, unit, component, server, computer, computing device, mechanism, terminal or other device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media and executed by the one or more processors.

Most crypto libraries, e.g. OpenSSL, are designed with an API which abstracts only the implementation of the cryptographic schemes, a.k.a. algorithms. This doesn't break the dependency between the application and the schemes.

For instance, ECDSA is implemented in different ways. Some do it in one call. Others split it into two phases, one for hash, the other one for the signature generation. Others do a separate computation of the $k^{-1}$ mod n, n the prime order of the generator point, and then call the signature generation. So, implementations are different but a common API, ECDSA_sign(curve, privatekey, message, signature) can accomodate them. Now, if we want to change ECDSA with another signature scheme X, the application has to change the ECDSA_sign( ) to X_sign( ) and recompile.

Nowadays, the need for the release of the application from managing cryptographic schemes became a priority, due to the rapid changes experienced in the field of cryptography use for security. Algorithms become obsolete much sooner, new ones are expected to take the lead, e.g. PQC. With respect to PQC, it is not only about the future, but also about the present. Businesses dealing with sensitive data—energy, transportation, space, banking, military—need to protect that data starting today. Attackers collect that data and they'll decrypt it when the quantum computers will be available. The value of their content is very high, so attackers prefer to store them for a few years until they get access to the context. The protection is done by using PQC algorithms for sensitive data, and classical algorithms for the rest. This happens in the same application, so it must be able to switch between algorithms.

Those are just a few reasons to go further into the abstractization of the API, so that the application can work with different algorithms without being necessary to rebuild/recompile it.

The first step is to abstract the cryptographic schemes. For instance, for digital signatures, the API provides a call API_sign( ) which deals internally with the selection of the scheme and its implementation. It could be ECDSA, or X, but now the decision is removed from the application.

Another step would be to abstract the cryptography use. For instance, the application needs to authenticate an entity. The authentication could involve digital signatures with challenges or certificates, public key encryption, or other protocols or resources. The application doesn't see API_verify( ) but API_authtenticate( ) For confidentiality, most cases use symmetric encryption. If there is a need for other methods, like using a dedicated channel, again the API_encryptMessage( ) is replaced with API_protectMessage( ).

In the two described previous cases, the role played by the application diminishes. The work is done be the provider, which contains the implementations, and a control entity, which decides what/how to use the provider.

The control entity provides runtime input to the provider. A case is the use of hybrid certificates with a policy mechanism to select with a digital signature to be verified at runtime.

The present embodiments provide a method to delegate the dealing with cryptographic algorithms from an application to other entities/components. The entities are the provider and control policy. This allows for use of the application without the need to rebuild it with different cryptographic schemes. We call this feature agility. So, the role played by the application is played now by provider and policy, leaving the application oblivious to changes.

OpenSSL and Our Agility

OpenSSL [6] doesn't offer the agility. The need for it ended with the introduction in version 0.9.6 of the ENGINE abstraction, which is the OpenSSL native mechanism to handle alternative cryptographic implementations for the built-in schemes and addition of new schemes for PRNG, symmetric ciphers, hashing and public key schemes. We use it to hold the API and leave the implementation for dll.

OpenSSL Implementation

OpenSSL is still in dominant use today, AD 2021, for the SSL/TLS protocol. The SSL/TLS stack of OpenSSL uses cryptographic schemes, e.g. PRNG, KA (key agreement), etc. The SSL/TLS stack of OpenSSL uses also X509 certificates for authentication of public keys and the X509 module uses cryptographic schemes, e.g. hash, digital signature. The cryptographic part comes from libcrypto.so built-in implementation, or from custom implementations through the ENGINE mechanism. So, one of the two component we described above, or both, the API and the provider, have to be implemented as ENGINE. This is because both play the role of new cryptographic suites for OpenSSL. Which one should be an ENGINE?

The first solution is to have the API as engine and leave the provider as dll.

The alternative is to have a standalone API and the provider to come as engine.

In the first approach, the API engine contains the abstract layer from section (1), so you'll find Hash_begin( ) in there, for instance. Hash is registered by the engine as a new hash scheme and OpenSSL will treat it as such, making it available to other modules, like X509 or SSL module. If a new scheme has to be used, its implementation will be offered as a dll, which will be loaded by the API. The application has to mention the API engine name as input for SSL functions, or X509 functions, etc.

In the second case, the construction of the API becomes independent of OpenSSL, and the providers become ENGINEs. OpenSSL is unaware of that API. When the application calls X509_certverify( ) this function can call functions from the provider if its engine is mentioned, but not from API. To insert API calls into X509 means to rebuild libcrypto.so, which we don't intend to do.

The present embodiments are generally directed to the first case and built the API into an engine. This way, we have a real separation between the application and the cryptographic algorithms and their implementation. In [1] and [2], this separation is missing. There, all cryptographic schemes are registered in OpenSSL, leaving the application to do the selection.

There are situations where several cryptographic schemes to be used are provided to the application. For instance, in TLS protocol, the client presents the available schemes and the server will select one. The list presented by the client is the policy file. The selected scheme implementation will come from a provider, whose name is passed by the application to OpenSSL, so it can be loaded.

FIG. 1 shows a picture similar to the one in [1]. The Provider has implementations of digital signature ECDSA, key agreement ECDH and hash SHA256.

Control Policy

Besides agility, which means "I can run whatever crypto schemes you want", we are looking for an adaptability feature, which means "I can run the way you want to run your crypto schemes in your environment". For instance, for a hybrid X509 certificate, we want to be able to select each one of the digital signature schemes involved and run only that scheme for verification, and this process to be adaptable to time, e.g. today I want one of them, tomorrow I want the other one.

A solution is to provide a runtime input of the active schemes by listing them in a configuration file, a mechanism already used by OpenSSL. The provider has to have the implemented functions able to read that file and continue or return based on the presence of their scheme name in that file. The application is oblivious of that decision.

OpenSSL X509 Certificates

The cryptographic functions for X509 module are accessed from the libcrypto.so or through an engine. The engine is basically a crypto suite and after registration, its crypto schemes are used like any other scheme. When these are accessed from an engine, OpenSSL needs as input the name of that engine. The API engine can set a default name, e.g. APIEngine or cryptoEngine. The suite/provider name coming from the provider will be used like any other scheme name in OpenSSL.

For X509 certificates, the information with respect to cryptography is coming from the keys. The private key gets the algorithm, which is set when the engine is initialized, then is passed to public key and/or certificate.

Here are some examples. The application is the command-line tool openssl, the API engine is libapiengine.so, the provider is libagilesec_crypto.so.

```
# CA private key:
openssl genpkey -engine libapiengine.so -algorithm apikeygen -out CAPrivateKey.pem
# CA public key:
openssl pkey -engine libapiengine.so -in CAPrivateKey.pem -pubout -out CAPublicKey.pem
# CSR for CA:
openssl req -engine libapiengine.so -new -key CAPrivateKey.pem -nodes -out CAReq.pem
# self-signed X509 certificate for CA:
openssl x509 -engine libapiengine.so -reqin CAReq.pem -signkey CAPrivateKey.pem - out CACert.pem
# verify that certificate:
openssl verify -engine libapiengine.so -CAfile ./CACert.pem CACert.pem
```

Agilesec Implementation

The Agilesec SDK v.1.7.2 by ISG is used in this project. The API engine is designed to use the Agilesec API and Agilesec provider structure. We use the Agilesec SDK as it is, with no need for modifications.

Agilesec Provider

The asec_Provider is a selection of the schemes implementations present in Agilesec SDK, structured based on algorithm classes—symmetric ciphers, digital signature, key agreement, etc., there are 13 of them. The intent is to offer a unified view of the backend to the Agilesec API. In Agilesec SDK, the term algorithm refers to an instance of a cryptographic scheme, or two, including parameters, attributes, dependencies, etc.

The asec_Provider materializes as an array of nodes, each node being an asec_CryptoProvider. An asec_CryptoProvider will register with a provider, which means that it is added to the array as a node. The asec_CryptoProvider is a list of algorithms and metadata. A provider is built using this registration mechanism.

How does the registration work?

Let's look at SHA256. The implementation has basically three functions SHA256_reset( ), SHA256_update( ), SHA256_get( ) which are wrapped into sha256_begin( ), sha256_update( ), sha256_get( ) for the provider. We package them in a struct HashApi type structure named hash_api_sha256, which is basically a list. Then we register to our provider by creating a CryptoProvider with that list and adding that CryptoProvider as a node.

In short, the functions which implement a cryptographic scheme, e.g. SHA256, are wrapped into a provider format, put into a cryptographic provider which is inserted into the array of our provider.

If we pick another implementation for SHA256, we have to rewrite the wraps, but the rest stays the same.

How does an application call those functions from the provider?

Having the provider built, the functions we can use from it are the wrapped ones. To retrieve them, we have to use the provider as input and to search for them. The search is done by one of the functions

```
asec_AlgorithmByName( ),
asec_AgorithmByVariant( ),
asec_AgorithmByComponents( ),
asec_AgorithmByOid( ),
```

```
asec_AgorithmByX509AlgId( ),
asec_AgorithmByCvcPubKey( ),
``` which return the result as an asec_Algorithm value. Calling the API corresponding function with this value as input will select the function we were looking for. For example, to call sha256_begin( ), we find the algorithm and then call the API function asec_HashBegin( ) with that algorithm value as input.

For sequel calls to asec_HashUpdate( ), or asec_HashGet( ), we don't have to do the search again, for the algorithm value is made available by the first call to asec_HashBegin( ) through a context.

In our provider, some nodes have multiple CryptoAlgorithms, whose names reach the application level. To make the application non-dependent on those names, we can implement the nodes with only one algorithm, which will have a generic name. For instance, the CryptoProvider for SHA256 will have the name "asec_crypto_hash" and will have a unique algorithm named "hash" which contains the SHA256 implementation. The real name "sha256" will be stored in the description field of the HashAp member of the CryptoAlgorithm, so it could be available. Another Agilesec provider will have in the node named asec_crypto_hash, an algorithm named "hash", but holding now the implementation of SHA3-256. The real name "sha3-256" is stored in the description field of the HashApi member of the CryptoAlgorithm.

This way, a call to asec_AlgorithmByName( ) to find the hash functions in the provider will always have the input "hash" for algorithm name.

If we want to keep multiple algorithms into a node, then a solution will be to use a configuration file to select the algorithm, keeping the application oblivious of that name.

Agilesec API

The Agilesec API needs as input the asec_Algorithm, which is a context used to retrieve implementations of specific cryptographic schemes from the provider. The asec_Algorithm type contains a pid, a reference to an asec_Provider, an array of ProviderNodes which each points to a CryptoProvider and a list of 13 CryptoAlgorithm types. To do the search, the name of the scheme is used in calls like asec_AlgorithmByName( ), which annulles the agility feature of Agilesec API. For instance, if we want to call asec_HashBegin(asec_Algorithm algorithm, const char* params, asec_Context* ctx), we have to have an algorithm. To get that algorithm, we call

```
asec_AlgorithmByName(const char* name,
    size_t nameLength,
    asec_Algorithm* algorithm,
    asec_Provider p)
``` so, the application needs the name. The provider we built though has generic names for algorithms, so in this case we can call with the name "hash". We keep this mechanism in place and wrap asec_HashBegin( ) preceded by a call to asec_AlgorithmByName( ) to get that algorithm into a format to match the OpenSSL EVP prototypes.

In this format, the wrapped Agilesec API functions can be register to OpenSSL in an ENGINE.

The engine is controlled by four call-backs:

```
engine_init( ),
engine_bind( ),
engine_finish( ),
engine_destroy( ).
```

Our provider is dynamically loaded into a context which is linked to the engine by ENGINE_set_ex_data( ) into extended data component. This is done by engine_init( ). All the API functions are registered as EVP methods to OpenSSL by engine_bind( ).

Application & OpenSSL

An application can interact with Agilesec SDK as crypto source through the Agilesec API. We can change the provider and not affect the application or Agilesec An application can interact with OpenSSL as crypto source through the EVP API based on our engine. We can change the provider and not affect the application, OpenSSL and the engine.

How does this EVP work ?

The EVP is an abstraction layer for the cryptographic functionality, based on the concepts of context and method. The context is a holder of data to be shared during the execution and the methods are the functions which implement the schemes. For instance, to sign a message, we have to generate an algorithm context using a key type and an engine, initialize the key context, generate a key pair, initialize a public key context for signing and perform the signing operation using that context.

This is the sequence:

```
EVP_PKEY_CTX *EVP_PKEY_CTX_new(EVP_PKEY
    *pkey, ENGINE *e);
int EVP_PKEY_keygen_init(EVP_PKEY_CTX *ctx);
int EVP_PKEY_keygen(EVP_PKEY_CTX *ctx,
    EVP_PKEY **ppkey);
int EVP_PKEY_sign_init(EVP_PKEY_CTX *ctx);
int EVP_PKEY_sign(EVP_PKEY_CTX *ctx,
    unsigned char *sig, size_t *siglen,
    const unsigned char *tbs, size_t tbslen);
```

If the message has to be hashed and then signed, then another sequence is available.

```
int EVP_DigestSignInit(EVP_MD_CTX *ctx,
    EVP_PKEY_CTX **pctx,
    const EVP_MD *type, ENGINE *e, EVP_PKEY *pkey);
int EVP_DigestSignUpdate(EVP_MD_CTX *ctx,
    const void *d, size_t cnt);
int EVP_DigestSignFinal(EVP_MD_CTX *ctx,
    unsigned char *sig, size_t *siglen);
```

We see that the ENGINE is present at the first step, and its information is conveyed through the context to the next steps.

OpenSSL and its engines

We wrapped the Agilesec API functions so that we can register them as a new crypto suite in OpenSSL. For instance, the API functions asec_Sign( ) and asec_Verify( ) are wrapped in evp_pkey_asec_Sign( ) and evp_pkey_asec_Verify( ), which are added to an EVP_PKEY_METHOD structure where they share the same NID_sig. Same for evp_pkey_KeyPairGen( ), evp_pkey_AnonKeyAgree( ), etc. All those evp_pkey functions are now registered to OpenSSL by engine_bind( ) with a call-back engine_pkey_pmeths( ) we provide to the engine. That last step collects all our evp_pkey functions under the same array of NIDs.

This registration is controlled by the NIDs, so we need to provide them for those packages, which are 13 in Agilesec API.

We have to create them at compile-time or runtime, establishing the link between the NID and OID, the algorithm name, which is simply set to generic values, like "hash", "sig", "keypair", etc.

Functions in the SSL stack use NIDs as input parameters, so better make some NIDs for the new 'API crypto suite'.

Some structures in Agilesec pertaining to provider have to set data fields at compile-time, e.g., hash block or digest lengths. We have to do it now at runtime. At runtime, the place is in engine_init( ) which is the first to get the provider. create_object( )??

These are the data types used to convey the public and private keys from internal to external format.

```
typedef asec_Context asec_PublicKey;
typedef asec_Context asec_PrivateKey;
typedef struct _asec_Context* asec_Context;
struct _asec_Context {
uint64 tag;
.....
/** Pointer to context specific internal state, provider
must deallocate via the 'ContextDestroy hook' */
void* ctx;
.....
}
for instance in
int
asec_KeyPairGen(asec_Algorithm algorithm,
    const char* params,
    asec_Random random,
    asec_PublicKey* publicKey,
    asec_PrivateKey* privateKey);
```

In Agilesec SDK, the public and private keys at API level are typed as asec_PublicKey, asec_PrivateKey, each being an asec_Context, which is a pointer to a structure_asec_Context, which has a ctx field intended for internal state values. For the ECC case, the ECCPublicKey and ECCPrivateKey after they are generated they are stored in the ctx field of the _asec_Context.

Agilesec SDK doesn't have a type, internal or external, for key pairs.

OpenSSL uses the EVP_PKEY type for those keys, for instance in int EVP_PKEY_keygen(EVP_PKEY_CTX*ctx, EVP_PKEY **ppkey);

These are the data types used to convey the signatures from internal to external format.

```
typedef struct {
    unsigned char* data;
    size_t length;
    size_t capacity;
    size_t position;
} asec_Buffer;
for instance in
int asec_Sign(asec_Algorithm algorithm,
    const char* params,
    asec_PrivateKey privateKey,
    asec_Random rng,
    const asec_Buffer* data,
    asec_Buffer* signature);
```

So, at API level, the signature is stored as an array of asec_Buffer, pointed to by signature.

Internally, there is an asec_Signature context, which stores the signature in its params member, which is an array of asec_Buffer, one buffer per 'param', i.e. component. For the ECDSA case, the signature is stored in the asec_Signature→params member in two asec_Buffer, one for each component r and s of the ECDSA signature.

In OpenSSL, digital signatures are typed as unsigned char array also, for instance in:

```
int EVP_PKEY_sign(EVP_PKEY_CTX *ctx,
    unsigned char *sig, size_t *siglen,
    const unsigned char *tbs, size_t tbslen);
The case of EVP_PKEY_assign( ) ...
```

This function allows you to set a key into a EVP_PKEY structure, more exactly pkey→pkey.ptr is set to the address of the key. The 'key' could be a public key, private key, key pair.

This is our case, when we generate a keypair with asec_KeyPairGen( ) and have to set it into a EVP_PKEY pkey. When the EVP_PKEY was an open structure, the simple assignement pkey→pkey.ptr=key; will do the work. When it became opaque, a type checking was involved and later a key management too. The input type is checked to be registered with an EVP_PKEY_ASN1_METHOD for an engine, and then is set in pkey together with the engine and the key value. If not, no assignment is performed. The EVP_PKEYASN1_METHOD provides methods to deal with the key: encode/decode, print, size, security level, etc. Basically, an engine has to be found which supports that type and this happens in EVP_PKEY_set_type( ) call inside EVP_PKEY assign( ). The key reference is set in pkey→pkey.ptr.

Caution, if the pkey doesn't have an ASN1 method, but has engines attached to it, then those engines are releases through calls to ENGINE_finish( ).

So, we have to provide an EVP_PKEY_ASN1_METHOD through our ENGINE.

A further caution that the function set with ENGINE_set_pkey_asn1_meths( ), which in our case is engine_pkey_ameths( ), has to return the num_nids, the number of ASN1 nids which are registered to OpenSSL. For num_nids nids the engine is registered as supporter of that nids, aka types. EVP_PKEY_set_type( ) is searching in that list for engines which support an input type, so everybody must be in the list.

Structural and Functional References to ENGINEs

In OpenSSL, the ENGINE objects are handled in two ways, both based on a reference-count method: when the ENGINE is accessed, referenced, the count increases by 1, when the ENGINE is released, dereferenced, the count is decreased by 1. The two ways are different based on what you do with that ENGINE. When they are created, the ENGINES are added to a linked-list stored internally by OpenSSL.

The structural reference is used to create an ENGINE (basically malloc( )), to search that linked-list or other administrative tasks. You create a structural reference by calling ENGINE_new( ) and release it with ENGINE_free( ).

A functional reference is an ENGINE which can perform a task on its own, i.e. it is a structural reference initialized. You get a functional reference by calling ENGINE_init( ) for a structural reference, or getting the default ENGINE for a cryptographic task, by calling ENGINE_get_default_RSA( ) for example. A functional reference can be released by ENGINE_finish( ) which blocks the functionality it provided so far, returning a structural reference.

Comments

We presented the triad application-API-provider in a model to render the application agile, meaning that we can change the cryptography to be used without changing the source code of the application. The application is oblivious about the selection of the cryptographic schemes and their implementations, but is well aware of the OpenSSL functions for SSL, X509, etc. The API plays the role of a new cryptographic suite and is registered with OpenSSL through an ENGINE. The provider is a dll library containing the implementation of an instance of the API and it is loaded by the engine. From a programming perspective, the API is an interface, and the providers are instances of it.

To summarize:
  separation of the application from the cryptographic package to gain agility, i.e. we can change at runtime the crypto library without changing the application.
  cryptographic package structured as API+provider: API is the interface, provider is the instance of it.
  API is registered to OpenSSL as a new crypto suite through an ENGINE, provider is a separate dll.
  control policy is implemented in the provider.
  a node in the provider holds only one algorithm.
  for all providers, the nodes and algorithms have fixed generic names; the real name of the algorithm is in the description field of the node.
  using those streamlined providers with constant generic names for nodes, the engine also will stay untouched; so, of the triad application-engine-provider, we can replace the provider and keep the same application and the same engine.

Same problem occurs for asec_Verify( ) when the input params is NULL.

In crypto/platform/src/buffer.c, in asec_BufferAlloc( ) in the "if" after the comment " . . . and buffer→data points to a static buffer . . . ", the buffer data is not checked to be !NULL.

The line if (!buffer→capacity buffer→length>=length) buffer→length=length; should be replaced with if (buffer→data !buffer→capacity buffer→length>=length) buffer→length=length;

Generalization

In this disclosure, we have described a how to build the triad application-API-provider in a model to render the application agile via the notion of ENGINE with relevance to OpenSSL. Our methodology extends and is adaptable to not only OpenSSL, but to any crypto libraries, like WolfSSL, BouncyCastle, BoringSSL, and any other crypto library that exists or yet to exist.

REFERENCES

[1] https://eprint.iacr.org/2018/354.pdf, https://github.com/romen/libsuola/[2]
[2] https://github.com/open-quantum-safe/oqs-engine
[3] https://ec.europa.eu/research/participants/documents/downloadPublic?documentIds=080166e5bdcc9a11&appId=PPGMS
[4] International Telecommunications Union: Information technology—open systems interconnection—the directory: Public-key and attribute certificate frame—works,â€ https://www.itu.int/rec/T-REC-X.509/en
[5] D. Cooper, S. Santesson, S. Farrell, S. Boeyen, R. Housley, and W. Polk. Internet x.509 public key infrastructure certificate and certificate revocation list (crl)

profile. RFC 5280, RFC Editor, May 2008. http://www.rfc-editor.org/rfc/rfc5280.txt

[6] https://www.openssl.org/

Although the invention has been described with reference to certain specific embodiments, various other aspects, advantages and modifications thereof will be apparent to those skilled in the art without departing from the spirit and scope of the invention as outlined in the claims appended hereto. The entire disclosures of all references recited above are incorporated herein by reference.

The invention claimed is:

1. A computer-implemented method for remote delegation of cryptographic processing from an application to other entities, the method comprising:
    structuring a cryptographic package with an application programming interface (API) as an engine of the cryptographic package, the cryptographic package comprising a plurality of cryptographic providers, each cryptographic provider comprising a dynamic-link library (dll) of an instance of the API;
    registering the API to a cryptographic library as a new crypto suite through the engine;
    implementing a control policy at a control entity to provide runtime input to the cryptographic providers;
    receiving an API call from the application to implement a cryptographic action via the API, the API selecting the cryptographic scheme to implement the action,
    wherein the engine replaces a previously used engine to dynamically link the cryptographic library used by the application, allowing runtime selection and usage of different cryptographic libraries from a plurality of cryptographic providers without application recompilation or modification.

2. The method of claim 1, wherein each node in each cryptographic provider comprises only one cryptographic algorithm.

3. The method of claim 2, wherein for each of the cryptographic providers, each of the nodes and cryptographic algorithms have fixed generic names respectively assigned.

4. The method of claim 3, wherein a real name of each of the algorithms is in a description field associated with the respective node.

5. The method of claim 1, further comprising generating a configuration file listing active cryptographic schemes at runtime, wherein each cryptographic provider determines if its respective cryptographic schemes are present in the configuration file prior to implementation by the application.

6. The method of claim 1, wherein the cryptographic action is signing with a digital signature.

7. The method of claim 1, wherein the cryptographic action is authenticating with a digital signature.

8. The method of claim 1, wherein the cryptographic library comprises OpenSSL.

9. The method of claim 1, wherein the cryptographic library comprises one of WolfSSL, BouncyCastle, and BoringSSL.

* * * * *